March 3, 1964 W. D. BAILEY ETAL 3,122,831
METHOD OF MANUFACTURE OF METAL ARTICLES
Original Filed Feb. 27, 1958 3 Sheets-Sheet 1
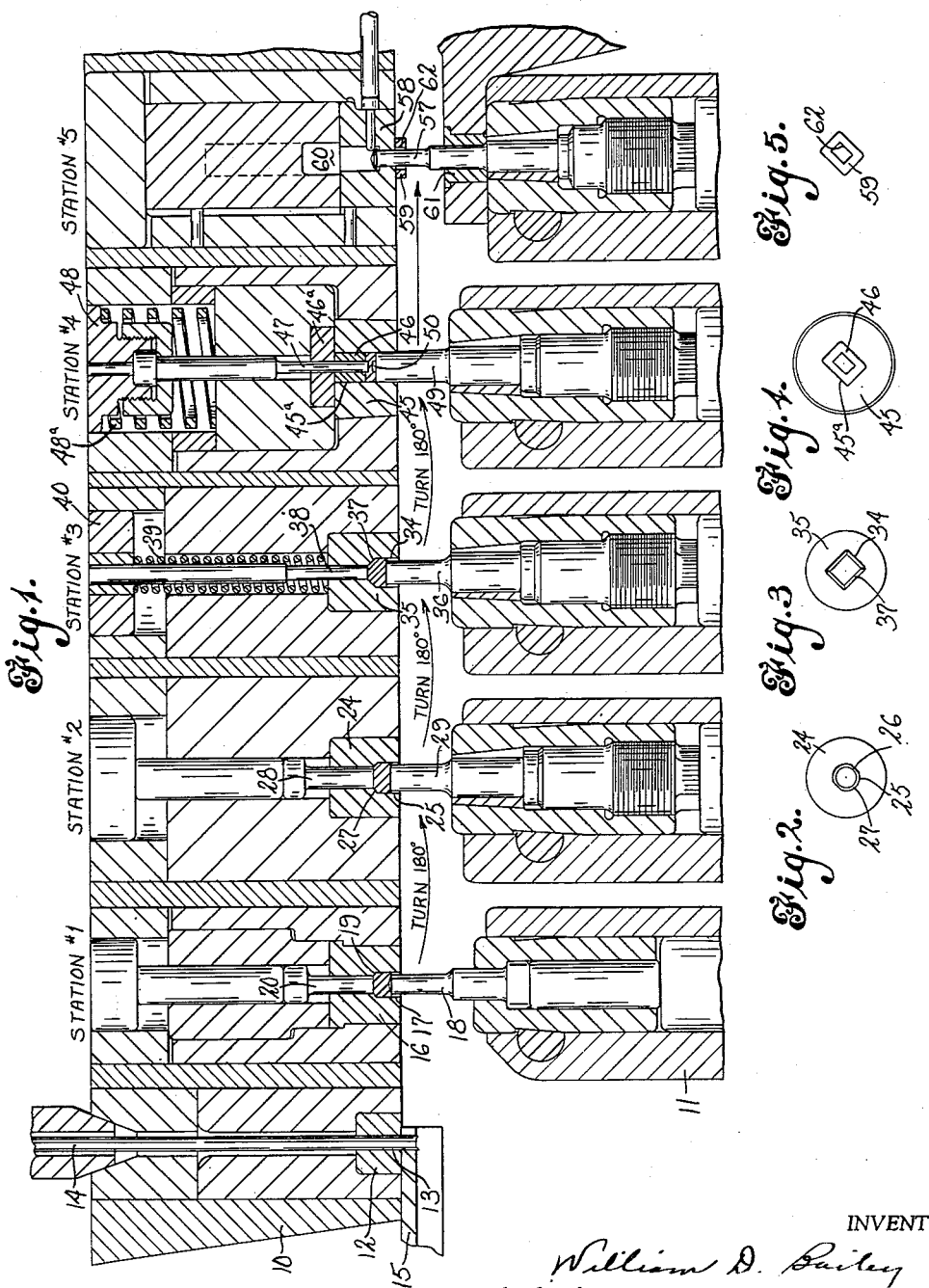
INVENTORS
William D. Bailey
and Donald R. Schumann
BY
Rockwell & Barickton
ATTORNEYS

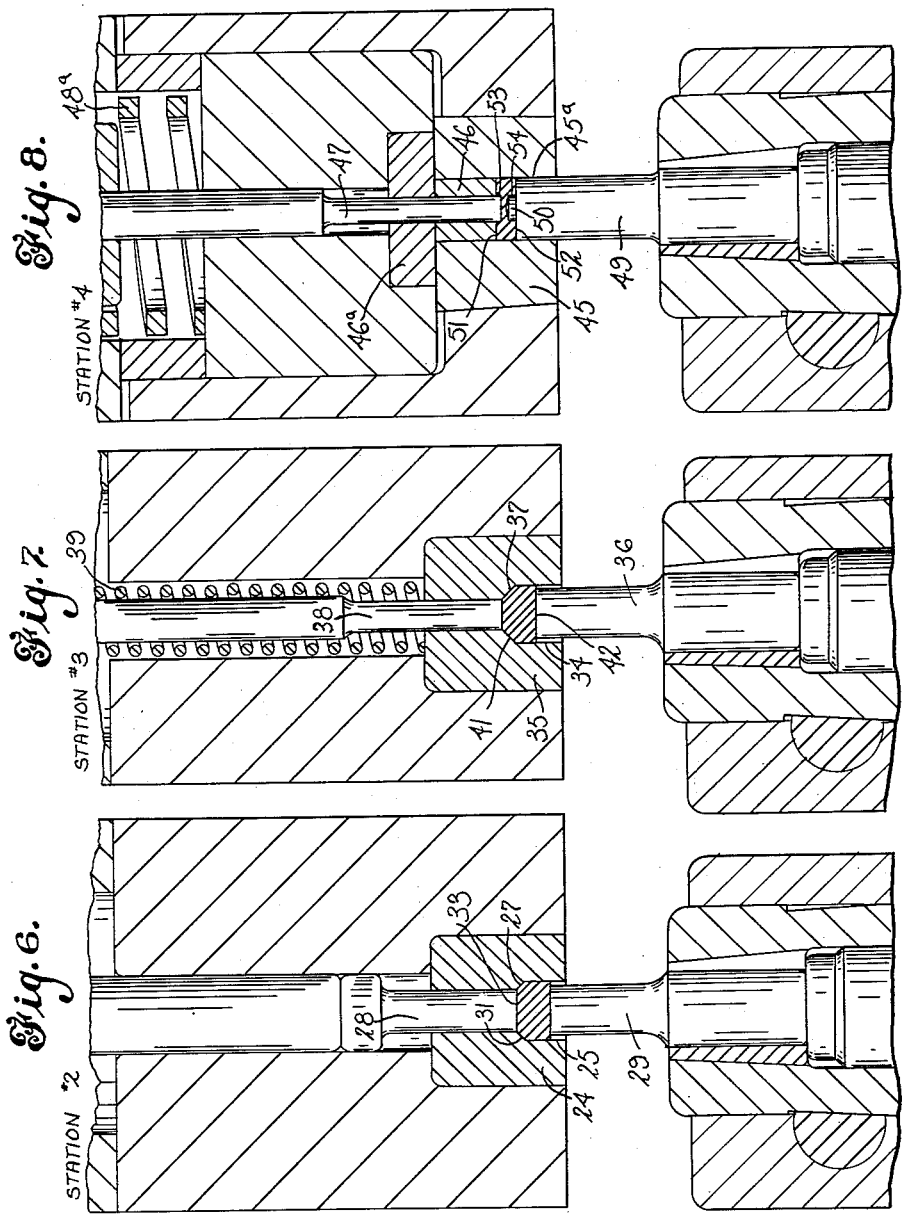

March 3, 1964  W. D. BAILEY ETAL  3,122,831
METHOD OF MANUFACTURE OF METAL ARTICLES
Original Filed Feb. 27, 1958  3 Sheets-Sheet 3

INVENTORS
William D. Bailey
and Donald R. Schurman
BY
Rockwell & Berthotour
ATTORNEYS

United States Patent Office 3,122,831
Patented Mar. 3, 1964

3,122,831
METHOD OF MANUFACTURE OF METAL
ARTICLES
William Dunn Bailey, Cheshire, and Donald Rowe Schurman, Thomaston, Conn., assignors to Textron Inc., Providence, R.I., a corporation of Rhode Island
Original application Feb. 27, 1958, Ser. No. 717,855. Divided and this application Aug. 16, 1960, Ser. No. 49,990
2 Claims. (Cl. 29—556)

This invention relates to a method of and apparatus for the manufacture of metal articles and particularly articles of rectangular shape wherein it is required that the corners be sharp and well defined and the upper and lower surfaces be smooth and flat. The present application is a division of our copending application, Serial No. 717,855, filed February 27, 1958, now abandoned.

As illustrated the method and apparatus are illustrated as applying to the manufacture of such articles as shading coils to be used with electric motors, which coils are of rectangular shape and are provided with a central opening which is usually also of rectangular shape. In order that such coils have the requisite electrical characteristics, it is required that they be manufactured quite accurately and provided with sharp edges and flat upper and lower surfaces. It is also advantageous that they be made so that no flash or burrs result from the various operations in order that they may be discharged from the machine in finished form.

The present method relates to the manufacture of such items in a machine of the progressive type in that a workpiece is cut from a length of stock (circular in cross section as herein illustrated) and this workpiece transferred to one after another of a number of stations in the same machine, the workpiece being operated on progressively until the final product emerges at the last station of the machine.

Also as illustrated the apparatus comprises a die bed having a plurality of dies therein and a reciprocable gate having a plurality of punches carried thereby, one to cooperate with each of the dies. The dies and cooperating punches have special and particular configurations in order to produce a rectangular blank or product from a piece of round stock as will be hereinafter explained. It will also be understood that transfer means are employed to transfer the workpieces or blanks from one station to the next. As this transfer means may be of the usual type, it is not deemed necessary to illustrate it.

One object of the present invention is to provide a new and improved method of manufacture of metal articles of rectangular shape from a piece of round stock.

Another object of the invention is to provide a new and improved method of manufacture of metal articles which are required to be made to close dimensions with sharp edges or corners and without flash or burrs to be removed.

Still another object of the invention is a new and improved apparatus for the manufacture of metal articles of the character described and particularly the manufacture of a blank of rectangular shape made from a workpiece initially circular in cross section.

Still another object of the invention is to provide an apparatus for making articles of the character described wherein the operations may be preformed on the article progressively at a plurality of stations in the same machine.

To these and other ends the invention consists in the novel features and combinations of parts to be hereinafter described and claimed.

In the accompanying drawings:

FIG. 1 is a sectional view of an apparatus embodying our invention by means of which the novel method may be practiced;

FIG. 2 is a face view of the die at station No. 2 of the apparatus, showing the shape of the die opening;

FIGS. 3 and 4 are similar views showing the shape of the die opening at stations Nos. 3 and 4;

FIG. 5 is a view of the finished blank after the operation at station No. 5;

FIGS. 6, 7 and 8 are enlarged sectional views of the tools employed at stations Nos. 2, 3 and 4 respectively;

Figure 9:
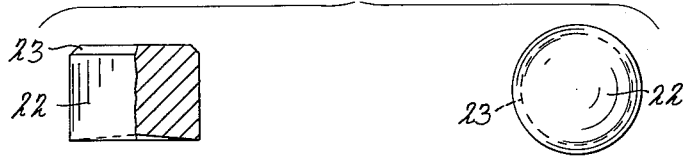
FIG. 9 represents an elevational view, partly in section, and a bottom plan view of the workpiece after being processed at station No. 1.

To illustrate one embodiment of our invention and one method of carrying out our improved process, there is shown in FIG. 1 of the drawings a die bed 10 provided with a plurality of dies and a gate 11 carrying a plurality of punches to cooperate with the dies. Adjacent one side of the die bed is a cut-off die 12 having an opening 13 through which is fed in the usual manner a piece of stock 14 of circular cross section from which a workpiece is severed by a cut-off member or knife shown somewhat diagrammatically at 15.

As usual in progressive machines of this character the knife carries the severed workpiece to the first or squaring station of the machine. At this station a die 16 is mounted in the die bed having an opening 17 with which cooperates a punch 18 carried by the gate 11. The die opening at this station is of circular shape in cross section and provided adjacent its inner end with a chamfer 19 to produce a chamfer upon the blank. A knock-out punch 20 is movably mounted in the die and is actuated at the proper time to eject the blank from the die into the transfer fingers (not shown) to be transferred thereby to the second station of the machine.

The appearance of the blank as it is ejected from the first station is shown in FIG. 9. As will be understood, the blank is of somewhat rough form after being severed from the length of stock and the operation at station No. 1 serves to square the workpiece, as shown at 22, and provide it at its die face with an annular chamfer 23. In the transfer of the blank between the first and the second stations, it is turned end for end so that the punch face of the blank at station No. 1 becomes the die face at station No. 2.

At this station a die 24 is provided in the die bed, this die having an opening 25 of the cross-sectional shape shown in FIG. 2, the opening being provided with flattened sides 26. Also at the inner end of this opening is a chamfer 27 and movably mounted in the die is a knock-out punch 28.

Cooperating with the die 24 is a punch 29 in the gate, the shape of which in cross section is similar to that of the die. It will be noted that the flat sides 26 of the die opening are neither horizontally or vertically disposed but are inclined at an angle to the vertical, as shown in FIG. 2.

Figure 10:
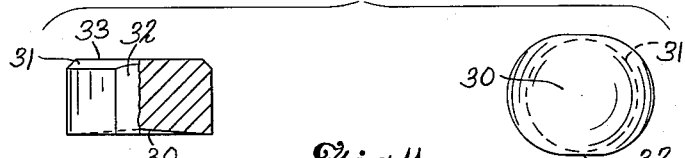
FIG. 10 represents an elevational view, partly in section, and a bottom plan view of the workpiece after being processed at station No. 2.

At station No. 2 it will be noted that the previously formed chamfer 23 is eliminated at the punch face of the blank, and at this face is slightly indented, as shown at 30. Here again at the die face of the blank a peripheral annular chamfer 31 is formed and the blank provided with opposite flat faces 32. It will also be noted that the blank is elongated in one dimension so that it is no longer circular in cross section but is of oblong shape. It is, however, substantially circular at the upper end surface 33, as shown in dotted lines in the bottom plan view of FIG. 10.

When the blank has been ejected from the die 24 by the knock-out pin 28, it is transferred to the third station of the machine wherein it is forced into the opening 34 of a die 35 by the punch 36. It may also be observed that during this transfer the blank is turned end for end so that again the punch face of the blank at station No. 2 becomes the die face at station No. 3. The opening 34 in the die 35 is of the shape shown in FIG. 3 and is of generally rectangular shape except that the corners are rounded to some extent and are not sharply defined. The punch 36 is of similar form. Also the die opening is provided with a substantial chamfer 37 so as to effect a chamfer to the inclined surface extending around all four sides of the blank at the die face thereof.

A knock-out pin 38 is movably mounted in the die 35 which may be actuated by suitable mechanism to eject the blank from the die. A compression spring 39 reacts between the die 35 and a block 40 to which the knock-out pin 38 is secured to normally hold the latter in a retracted position. This punch is of circular cross section so that the chamfer 37 terminates in a circular opening through which this knock-out pin extends.

Figure 11:
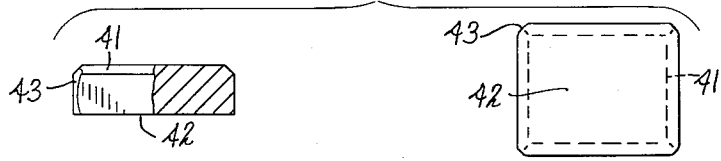
FIG. 11 represents an elevational view, partly in section, and a bottom plan view of the workpiece after being processed at station No. 3.

It will be noted from FIG. 11 of the drawings that at the third station of the machine the blank is elongated as well as being formed into polygonal or roughly rectangular form. It will be noted that while it has not been greatly enlarged in width from the size of the original stock, the length has been considerably increased. At the die face a chamfer 41 extends about the four edges of the blank while the punch face 42 is substantially flat. The corners, however, are somewhat rounded, as shown at 43, and are not sharply defined.

After the operation at station No. 3, the blank is transferred to station No. 4, and during this transfer the blank is again turned end for end so that the die face at station No. 3 becomes the punch face at station No. 4. At this latter station a die 45 is provided in the die bed and within the opening of the die is a die insert 46, the insert being of sleeve-like form so as to slidably accommodate the knock-out pin 47 connected to a block 48 so that it may be moved forwardly to eject the blank from the die. A compression spring 48a which acts on the block 48 normally urges the knock-out pin rearwardly to the position shown in FIG. 8. As shown in this figure the lower end of the knock-out pin extends below the die insert 46 so as to indent the upper face of the blank. The die opening 45a in the die 45 is of rectangular shape with its corners sharply defined, as shown in FIG. 4, and it will be noted that at this station as well as at station No. 3 the sides of the blank are inclined to the vertical. This enables the transfer fingers to grip the corners of the blank and, therefore, obtain a firm grip thereon.

The punch 49 which cooperates with the die 45 is of the same shape as the die in cross section and fits closely therein to prevent the formation of flash on the blank about the edges thereof. It may here be noted that the die opening 45a is tapered to some extent from an intermediate point toward its rear end so as to be slightly larger at its rear end and the insert 46 is similarly tapered so that the latter seats closely against the walls of the opening and is held in place by the block 46a.

The punch 49 is provided with a projection 50 which enters the blank and indents the punch face thereof. Both the projection 50 and the end of the knock-out pin 47 are of rectangular shape so as to provide indentations of rectangular shape in both faces of the blank.

Figure 12:
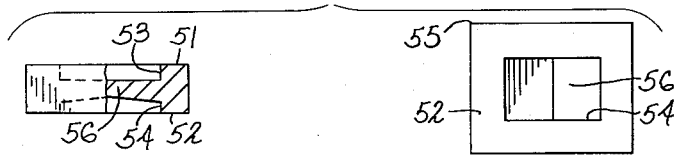
FIG. 12 represents an elevational view, partly in section, and a bottom plan view of the workpiece after being processed at station No. 4.

The form of the blank after the operation at station No. 5 is shown in FIG. 12. It will be noted from this figure that both faces 51 and 52 of the blank are flat except, of course, where the indentations 53 and 54 have been formed by the pin 47 and projection 50 of the punch. Moreover, as shown in the plan view in this figure, the side edges are of definitely rectangular shape with the corners 55 sharply defined without the existence of any flash or burr. The blank is now in its finished form with the exception of the piercing operation and is accurate in its dimensions. The indentations 53 and 54 are relatively deep so as to leave a thin web 56 therebetween, which web is punched out as a slug at the next succeeding station as will now be described.

The blank after being ejected from station No. 4 is transferred to station No. 5 or the piercing station wherein the web 56 is punched therefrom by the piercing punch 57 in cooperation with the die 58. The transfer from station No. 4 to station No. 5 is effected without turning the blank so that at the latter station it occupies the same relative position as at the former. As the gate moves forwardly, the end of the punch 57 which is of rectangular shape is received in the indentation of the workpiece 59 and drives the web 56 therefrom as a slug which is received in the opening 60 and permitted to drop from the machine. Upon withdrawal of the gate the blank 59 is stripped from the punch by stripper mechanism 61 of usual form.

Figure 13:
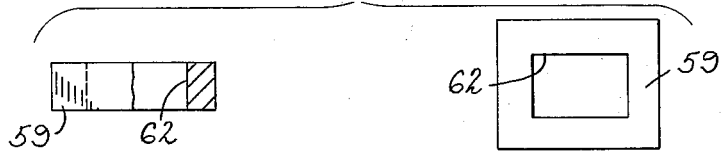
FIG. 13 represents an elevational view, partly in section, and a bottom plan view of the finished coil.

The finished blank is shown in FIG. 13 wherein it is of the same form as shown in FIG. 12 except that it is provided with a through opening 62 of rectangular shape. The sides of this opening are parallel to the exterior sides of the blank so that the same thickness of metal exists about the opening.

While we have shown and described one method of carrying out our improved process, it is to be understood that the invention is not to be limited to the details shown but is capable of modification and variation within the spirit of the invention and within the scope of the appended claims.

What we claim is:

1. The method of making a metal blank of oblong rectangular shape from a substantially cylindrical workpiece which comprises:

(a) cutting a workpiece from a length of stock, (b) exerting pressure in an axial direction, by means of a cooperating punch and die, on the opposite faces of the workpiece to form an annular peripheral chamfer at the circumferential edge of the workpiece within the die and to cause a flow of the metal along a line in a plane perpendicular to the axis of the workpiece, thereby enlarging the workpiece in opposite directions in said plane while preventing substantial enlargement in transverse directions in said plane, (c) turning the workpiece end for end, (d) exerting pressure in an axial direction, by means of a further cooperating punch and die, on opposite faces of the workpiece to form an annular peripheral chamfer at the circumferential edge of the workpiece within the die and to flatten the workpiece on its opposite faces and expand it laterally into substantially rectangular form in cross-section of greater length than width, (e) turning the workpiece end for end, (f) by the action of a further cooperating punch and die, indenting both faces of the workpiece while squaring the corners thereof, whereby the workpiece is expanded to completely fill the die cavity into the corners thereof, while the formation of flash is eliminated due to the previously formed chamfers, (g) transferring the workpiece to the final die station, and (h) piercing an opening through the blank.

2. The method of making a metal blank of oblong rectangular shape from a substantially cylindrical workpiece which comprises:

(a) cutting a workpiece from a length of stock, (b) exerting pressure in an axial direction, by means of a cooperating punch and die, on opposite faces of the workpiece to form an annular peripheral chamfer at the circumferential edge of the workpiece within the die and to cause a flow of metal along the line in a plane perpendicular to the axis of the workpiece, thereby enlarging the workpiece in opposite directions in said plane while preventing substantial enlargement in transverse directions in said plane, said direction of enlargement being inclined to the line of transfer between successive die stations, (c) turning the workpiece end for end, (d) exerting pressure in an axial direction, by means of a further cooperating punch and die, on opposite faces of the workpiece to form an annular peripheral chamfer at the circumferential edge of the workpiece within the die and to flatten the workpiece on its opposite faces and expand it laterally into substantially rectangular form in cross-section of greater length than width, the sides of the rectangle being inclined to the line of transfer between successive die stations, (e) turning the workpiece end for end while maintaining the sides of the rectangle inclined to the line of transfer between successive die stations, (f) by the action of a further cooperating punch and die, indenting both faces of the workpiece while squaring the corners thereof, whereby a workpiece is formed having squared corners that completely fill the corners of the die cavity without the formation of flash, (g) transferring the workpiece to the final die station while maintaining the sides of the rectangle inclined to the line of transfer between successive die stations, and (h) piercing an opening through the blank.

References Cited in the file of this patent

UNITED STATES PATENTS

| | | |
|---|---|---|
| 1,399,793 | Reed | Dec. 13, 1921 |
| 2,080,850 | Frayer | May 18, 1937 |
| 2,657,403 | Eade et al. | Nov. 3, 1953 |
| 2,714,450 | Chestnut | Aug. 2, 1955 |
| 2,756,444 | Schaeffer | July 31, 1956 |